(12) United States Patent
Sander et al.

(10) Patent No.: US 7,777,745 B2
(45) Date of Patent: Aug. 17, 2010

(54) EDGE EFFECT (75) Inventors: Nikolai Sander, Fairfax, CA (US);
Joseph Cleveland Ard, Matthews, NC (US)

(73) Assignee: Autodesk, Inc., San Rafael, CA (US)

( * ) Notice: Subject to any disclaimer, the term of this patent is extended or adjusted under 35 U.S.C. 154(b) by 506 days.

(21) Appl. No.: 11/741,621

(22) Filed: Apr. 27, 2007

(65) Prior Publication Data
US 2008/0266309 A1 Oct. 30, 2008

(51) Int. Cl.
*G06T 11/20* (2006.01)
*G09G 5/02* (2006.01)
(52) U.S. Cl. .................. 345/441; 345/589
(58) Field of Classification Search ............ 345/441, 345/589, 442, 443
See application file for complete search history.

(56) References Cited

U.S. PATENT DOCUMENTS

| | | | |
|---|---|---|---|
| 4,941,193 A | 7/1990 | Barnsley et al. | |
| 4,970,666 A | 11/1990 | Welsh et al. | |
| 5,847,712 A | 12/1998 | Salesin et al. | |
| 5,977,981 A * | 11/1999 | Brown | 345/581 |
| 5,982,383 A | 11/1999 | Kumar et al. | |
| 6,007,338 A | 12/1999 | DiNunzio et al. | |
| 6,031,541 A | 2/2000 | Lipscomb et al. | |
| 6,128,019 A | 10/2000 | Crocker et al. | |
| 6,202,073 B1 | 3/2001 | Takahashi | |
| 6,226,015 B1 | 5/2001 | Danneels et al. | |
| 6,256,039 B1 | 7/2001 | Krishnamurthy | |
| 6,268,865 B1 | 7/2001 | Daniels et al. | |
| 6,330,005 B1 | 12/2001 | Tonelli | |
| 6,373,499 B1 | 4/2002 | Acker | |
| 6,426,748 B1 | 7/2002 | Megahed | |
| 6,556,196 B1 | 4/2003 | Blanz et al. | |
| 6,628,279 B1 | 9/2003 | Schell et al. | |
| 6,813,042 B2 | 11/2004 | Hawksworth et al. | |
| 6,822,658 B1 * | 11/2004 | Lake et al. | 345/619 |
| 6,870,550 B1 | 3/2005 | Schuster et al. | |
| 6,912,293 B1 | 6/2005 | Korobkin | |
| 6,917,369 B2 * | 7/2005 | Perry et al. | 345/589 |
| 7,038,694 B1 | 5/2006 | Santodomingo et al. | |
| 7,050,067 B2 | 5/2006 | Raubacher et al. | |

(Continued)

FOREIGN PATENT DOCUMENTS

EP  1189176  3/2002

OTHER PUBLICATIONS

"The Prologue Battle," http://web.archive.org/web/*/http://lsdis.cs.uga.edu/~cthomas/courses/anim/slides/lotr_prologue_battle.html, Jun. 10, 2004.

(Continued)

*Primary Examiner*—Ryan R Yang
(74) *Attorney, Agent, or Firm*—Gates & Cooper LLP (57) ABSTRACT

A method, apparatus, and article of manufacture provide the ability to render an edge effect for an object. An object is obtained in a computer-generated rendering having vector geometry. An interior geometry is created for a fill of the object. Contour geometry is created for an outline stroke that covers an edge of the object. A proximity to the edge of the object is calculated for each pixel of the object and each pixel of the contour geometry. An effect is then rendered based on the proximities.

15 Claims, 8 Drawing Sheets

U.S. PATENT DOCUMENTS

| | | | |
|---|---|---|---|
| 7,061,501 | B1 | 6/2006 | Lake et al. |
| 7,190,376 | B1 | 3/2007 | Tonisson |
| 7,360,175 | B2 | 4/2008 | Gardener et al. |
| 7,616,219 | B2 * | 11/2009 | Foster et al. ............. 345/622 |
| 7,663,638 | B2 * | 2/2010 | Sander et al. ............. 345/582 |
| 2002/0059337 | A1 | 5/2002 | Takaoka et al. |
| 2002/0102989 | A1 | 8/2002 | Calvert et al. |
| 2003/0011599 | A1 | 1/2003 | Du |
| 2003/0058241 | A1 | 3/2003 | Hsu |
| 2004/0263512 | A1 | 12/2004 | Santodomingo et al. |
| 2005/0108215 | A1 | 5/2005 | Thomas et al. |
| 2005/0122334 | A1 | 6/2005 | Boyd et al. |
| 2005/0166138 | A1 | 7/2005 | Kundu |
| 2005/0190181 | A1 | 9/2005 | Sakagawa et al. |
| 2005/0225552 | A1 | 10/2005 | Anand |
| 2006/0114262 | A1 | 6/2006 | Yamauchi et al. |
| 2008/0117214 | A1 * | 5/2008 | Perani et al. ............. 345/441 |

OTHER PUBLICATIONS

"Flash Symbols," Smartwebby.com, http://web.archive.org/web/20050428080422/http://www.smartwebby.com/Flash/flash_symbols.asp (http://web.archive.org/web/*/http://www.smartwebby.com/Flash/flash_symbols.asp), Apr. 28, 2005.

Salisbury et al., "Interactive Pen-and-Ink Illustration," 3, 1995, pp. 1-8.

Adobe Creative Team, "Adobe Photoshop 6.0 Classroom in a Book," Adobe Press, chapter 3, Dec. 28, 2000.

Salisbury et al., "Orientable textures for image-based pen-and-ink illustration," ACM International Conference on Computer Graphics and Interactive Techniques, 1997, pp. 1-6.

Fabris et al., An efficient filling algorithm for non-simple closed curves using the point containment paradigm, IEEE, 1997, pp. 2-9.

Shadow Caster User's Guide, Sophisticated Drop Shadows and Effects for QuarkXPress, Copyright 2005, 37 pages.

SketchUp for Microsoft Windows User Guide, www.sketchup.com, pp. 38-40, 71, 251-252, 324, 364 (1999).

Reeves, W. et al., "Rendering Antialiased Shadows with Depth Maps," Computer Graphics, 21(4):283-291, Jul. 1987.

Curtis, C.J. et al., "Computer-Generated Watercolor," International Conference on Computer Graphics and Interactive Techniques, Proceedings of the 24th annual conference on Computer graphics and interactive techniques, pp. 421-430 (1997).

Van Laerhoven, T. et al., "Real-time Watercolor Painting on a Distributed Paper Model," Computer Graphics International, pp. 640-643 (2004).

International Search Report, International application No. PCT/US08/57899, International filing date Mar. 21, 2008.

* cited by examiner

ND EFFECT

CROSS-REFERENCE TO RELATED APPLICATIONS

This application is related to the following co-pending and commonly-assigned patent application, which application is incorporated by reference herein:

U.S. patent application Ser. No. 11/268,796, entitled "DRAWING STYLE DOMAINS", by Mason J. Foster, Jose Madeira de Freitas Garcia, and Joseph Cleveland Ard, filed on Nov. 8, 2005;

U.S. patent application Ser. No. 11/268,797, entitled "AUTOMATIC ELEMENT SUBSTITUTION IN VECTOR-BASED ILLUSTRATIONS", by Mason J. Foster, filed on Nov. 8, 2005;

U.S. patent application Ser. No. 11/286,658, entitled "CASTING SHADOWS", by Mason J. Foster, filed on Nov. 23, 2005;

U.S. patent application Ser. No. 11/286,535, entitled "STROKED FILL", by Nikolai Sander and Mason J. Foster, filed on Nov. 23, 2005; and U.S. patent application Ser. No. 11/458,465, entitled "VECTOR MARKER STROKES", by Nikolai Sander and Michael Perani, filed on Jul. 19, 2006.

BACKGROUND OF THE INVENTION

1. Field of the Invention

The present invention relates generally to architectural renderings, and in particular, to a method, apparatus, and article of manufacture for simulating a natural watercolor filling with realistic edge darkening in an architectural rendering.

2. Description of the Related Art

In the architectural, engineering, and construction (AEC) fields, computer aided design (CAD) drawings are often used to design blueprints, drawings, plans, etc. However, such CAD drawings may be complex, confusing, and fail to provide an end-user (e.g., a potential client) with a drawing or visualization of the "intent" of the architect or designer. Architectural renderings are designed to illustrate the "intent" of the designer or architect, as opposed to showing precise fidelity. In these renderings, the illustrator may want the inside of an object (referred to as fill) to appear natural. Prior art applications may attempt to provide such a natural appearance by modeling natural media materials and fills, such as those made be watercolor. However, accurately simulating watercolor may be difficult and/or consume extensive processing power. Such problems may be better understood with a description of prior art drawing software and methodologies.

CAD programs provide high fidelity drawings that fail to provide a visualization of the intent of the user. Such CAD programs or other drawing programs may be vector-based or raster-based. It may be possible to achieve hand-drawn effects in raster-based drawing programs. For example, in a raster-based paint program, a bitmap stroke may be created that appears hand-drawn (e.g., using a variety of raster-based drawing/paint tools). However, it may be preferable to work in a vector-based drawing. For example, in vector-based drawing programs, a user may work with modifiable shapes that can be edited, resized, and rearranged. Nonetheless, the inherent mathematical description of vector shapes lends itself to the production of hard-edged, non-organic artwork. Thus, it has always been a challenge for digital artists to achieve natural hand-drawn effects in a vector-based drawing program.

While the prior art has attempted to create vector-based strokes that appear organic, the prior art has failed to make object fills appear natural. For example, prior art programs may attempt to fill an object utilizing a single Bezier curve that wraps back and forth from one side of a shape to the next. Such a technique utilizes a single stroke and does not appear authentic or hand-drawn. Instead, the single Bezier curve appears computer generated. Another prior art technique may define a shape using a Bezier curve and utilize the defined shape as the paint stroke. For example, if a rectangle is defined, as the user draws the stroke and presses harder (e.g., using a stylus and tablet device), the rectangle deforms in relation to the pressure. However, the shape or stroke or pressure cannot be modified after it is drawn.

In view of the above, fills, in general, are typically either solid/transparent color, images or patterns. Such prior art fill techniques fail to achieve an easy, intuitive, vector-based modifiable means for providing a hand-drawn look of natural art tools.

In particular, prior art techniques have failed to achieve a fast efficient mechanism for creating and displaying a watercolor fill in a vector based environment. A number of commercial and academic efforts have been made in the area of watercolor rendering. One example of such a commercial effort is Painter™ from Corel Corporation™. The academic efforts have concentrated on performing a fluid simulation in order to approximate the water and pigment distribution on paper. Such efforts are more accurately described in the following articles that are incorporated by reference herein:

Curtis, C. J., Anderson, S. E., Seims, J. E., Fleischer, K. W., and Salesin, D. H. 1997. Computer-generated watercolor. In *Proceedings of the 24 th Annual Conference on Computer Graphics and interactive Techniques* International Conference on Computer Graphics and Interactive Techniques. ACM Press/Addison-Wesley Publishing Co., New York, N.Y., 421-430 (1997); and Tom Van Laerhoven, Jori Liesenborgs, Frank Van Reeth, "Real-Time Watercolor Painting on a Distributed Paper Model," cgi, pp. 640-643, Computer Graphics International 2004 (CGI'04), 2004.

In this regard, prior art techniques attempt to perform a fluid simulation to simulate how the water and pigment is distributed over a drawing page. For example, a drawing page may be divided up into cells and analyzed from one cell to another cell to determine the amount of water and pigment that is transferred between cells. However, calculating the watercolor using a fluid simulation is time intensive and, even when performed in real-time, will often only work on limited resolution bitmaps. Further, such fluid simulation does not scale well.

Accordingly, what is needed is the capability to simulate watercolor in a vector based computer application that is efficient, can be performed in real-time, and scales well.

SUMMARY OF THE INVENTION

To achieve a realistic edge darkening effect, one should be able to blend from an interior color of an image/object to a dark color at the contour of the filled image/object/shape. To realize this (e.g., in a pixel shader), the distance/proximity of the currently rendered pixel to the contour of the shape may be necessary. Such a proximity can be hard to obtain for arbitrary shaped fills.

One or more embodiments of the invention generate a stroke that covers the outline of the fill. The v-texture coordinate is then used as the edge distance. Since edge darkening is more likely to occur in areas with high pigment density, the edge darkening can be multiplied by low frequency noise (e.g., Perlin noise).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
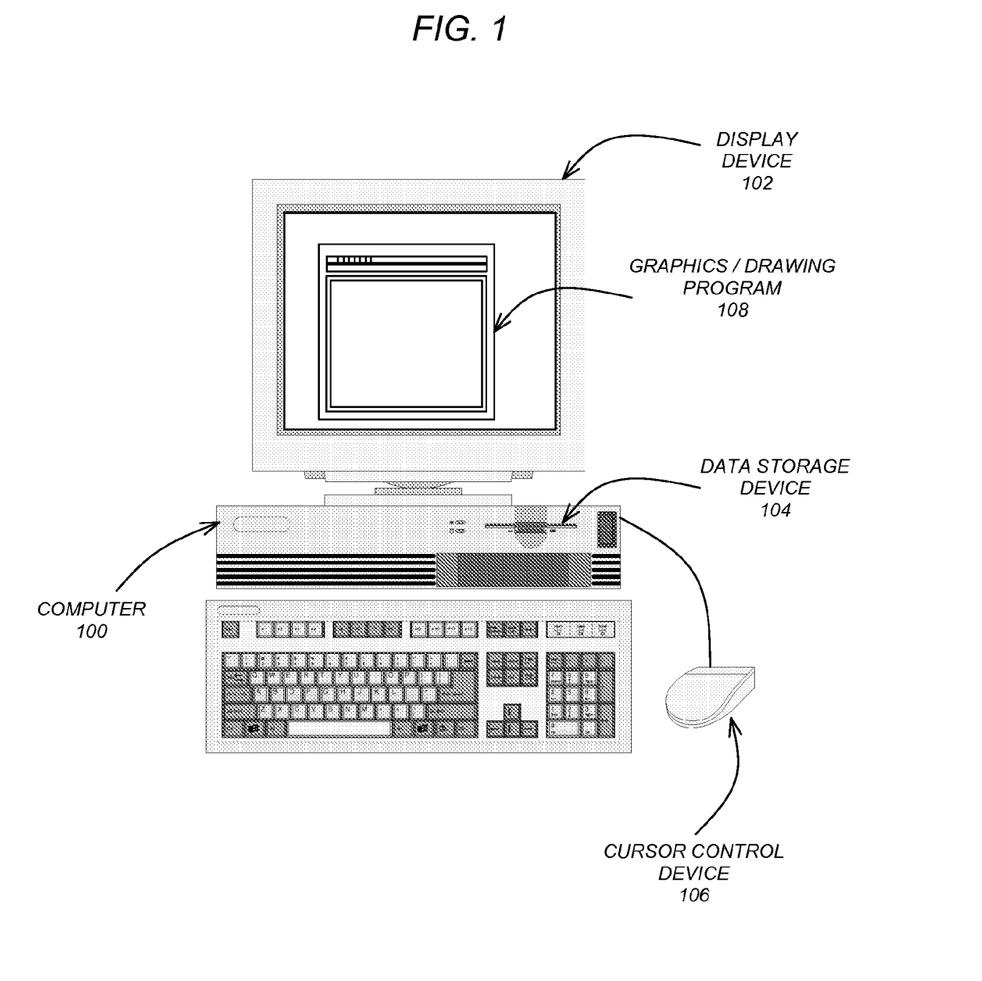
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Hardware Acceleration

Embodiments of the invention may also take advantage of hardware (e.g., graphic processing units or 3D rendering hardware) within the computer 100, to expedite the shading and rendering process. In this regard, graphics hardware minimum may be specified in order to take advantage of such capabilities. Strokes that are created may be transformed into flat 3D objects/meshes and a hardware renderer may then be used to shade the mesh. Alternatively, a flat 2D geometry (e.g., a single flat plane) is created with the various strokes, and shaded using the hardware renderer. In addition, the rendering may occur in three dimensions. For example, thickness and/or reflective properties may be provided for the fill material such that the material appears to extrude from the rendered image or reflect light (e.g., an oil paint may have depth and capabilities to reflect lighting). Alternatively, if a 3D model is used, the invention may collapse such a 3D model into 2D while storing some or all of the 3D information (e.g., storing information to respect the lighting).

Thus, the shading that is applied to the fill may be processed by a graphics hardware. However, the fill itself may be created without the use of such graphics hardware.

In addition to the creation of the fill or the shading using graphics hardware, the hardware may be used to dynamically view the rendered fill while parameters are being adjusted on the fly. In other words, while the user is adjusting one or more parameters, the display will automatically and dynamically update to reflect the adjustments. Such capabilities allow the user flexibility to view changes to various parameters in real time in an efficient and intuitive manner.

Rendering Software

In one or more embodiments of the invention, graphics program 108 is a vector-based drawing application (e.g., an architectural renderer) that provides a rendering (e.g., hand-drawn, cartoon-like, ultra-realistic 3D content) of a drawing. Another graphics program 108 may consist of a more precise fidelity application such as a CAD application.

As described above, vector drawing programs 108 are typically limited when it comes to modeling natural media materials and fills—such as those made by watercolor. One or more embodiments of the invention introduce an innovative vector rendering technique to simulate watercolor fills with realistic edge darkening. The rendering techniques are realized in a High Level Shading Language (HLSL) that allows even large watercolor fills to be rendered in real-time. Alternatively, other shading languages may be utilized (e.g., GLSL™ [Open GL Shading Language] or NVIDIA™ Cg).

In addition to the above, graphics application 108 may also render images utilizing a shader. A shader is a computer program used in 3D computer graphics to determine the final surface properties of an object or image. A shader often includes arbitrarily complex descriptions of various properties such as light absorption, reflection, refraction, shadowing, etc.

Various types of shaders exist. A vertex shader is applied for each vertex and runs on a programmable vertex processor. Vertex shaders define a method to compute vector space transformations and other linear computations. A pixel shader is used to compute properties that, most of the time, are recognized as pixel colors. Pixel shaders are applied for each pixel and are run on a pixel processor using values interpolated from the vertices as inputs.

A shader (e.g., a pixel shader) may work locally on each point that is rendered. In this regard, given the location and attributes of one point on a surface, the shader returns the color on that point. In addition, shading algorithms are often based on the concept of multiple passes. A shader, at its highest level, is a description of how to render an object multiple times to achieve a particular effect that is not possible with only a single rendering pass. Multiple passes can describe more complex effects than single passes since each rendering pass can be different from the other rendering passes. The results of each pass may be used as input to the next pass, or are combined in the frame buffer with the previous passes. For example, if it is desirable to render an object with two textures but the hardware only supports the ability to render one texture at a time, the object can be rendered once for each texture (i.e., a pass is performed for each texture) and the results are added together.

Watercolor Simulation

In the prior art, the simulation of watercolor in rendering software has been generally associated with computer paint systems. One or more embodiments of the invention are designed as a colorization and illustration system for large vector-based page descriptions. Two novel properties that may result from the invention include a natural media renderer, which in many cases is difficult to distinguish from the traditional paper-based media, and a frame rate refresh (1/30 of a second or faster) of large data sets without sacrifice of image quality.

A primary contributing factor that provides watercolor with its characteristic look is the granulation of the color. Such granulation emphasizes the peaks and valleys of the paper. A second primary contributing factor is an edge darkening effect that is caused by the transfer of watercolor pigments from the center of a watercolor stroke towards the edges when the color dries due to the surface tension of the water. Typically more saturated areas where there are more color pigments deposited show more edge darkening, since those areas contain more water that cause the edge darkening when it dried.

Figure 2A:
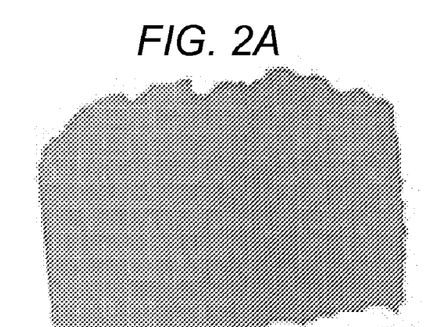
FIGS. 2A-2G illustrate examples of the granulation and edge darkening effect for watercolor in accordance with one or more embodiments of the invention.
Figure 2B:
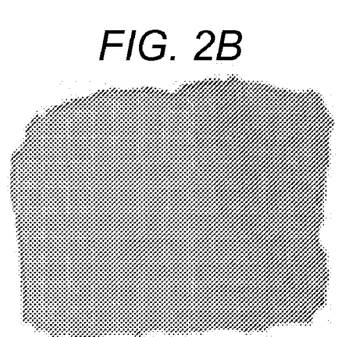
Figure 2C:
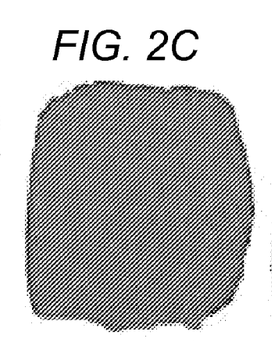
Figure 2D:
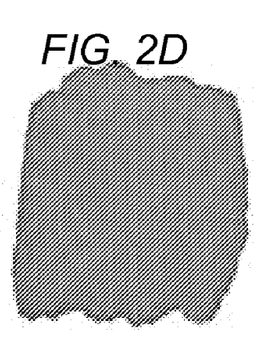
Figure 2E:
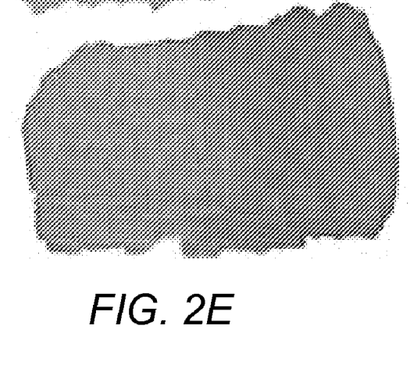
Figure 2F:
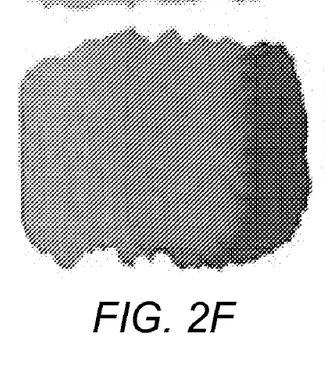
Figure 2G:
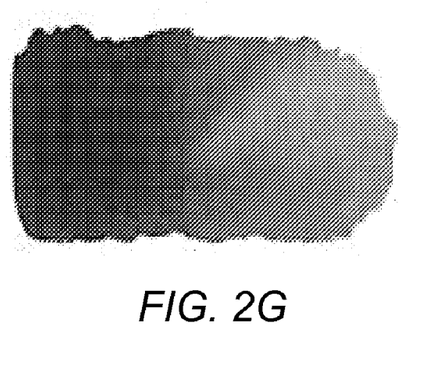

FIGS. 2A-2G illustrate examples of the granulation and edge darkening effect for watercolor. In FIG. 2A, the edges are darker around the top and side of the object. In addition, it can be seen that the fill of the object has a granulation that simulates the appearance of paper. In FIG. 2B, the edges are darker around the top left, top, and right side of the object. Further, the granulation and fill is darker on the right side of the drawing. In FIG. 2C, the edge is darker around the entire object and a granulated fill simulates paper. FIGS. 2D-2G illustrate similar edge darkening in certain areas of the edge (that may propagate more or less into the object itself) along with granulation that simulates the appearance of paper. Again, in the prior art, such a simulated water color appearance was performed using fluid simulation and/or image blur operations to approximate the water and pigment distribution on paper.

Granulation:

In accordance with one or more embodiments of the invention, a realistic looking granulation effect of watercolor may be achieved by combining high frequency Perlin noise with a low frequency Perlin noise. The entire image/object may then be multiplied by the combined noise.

Figure 3:
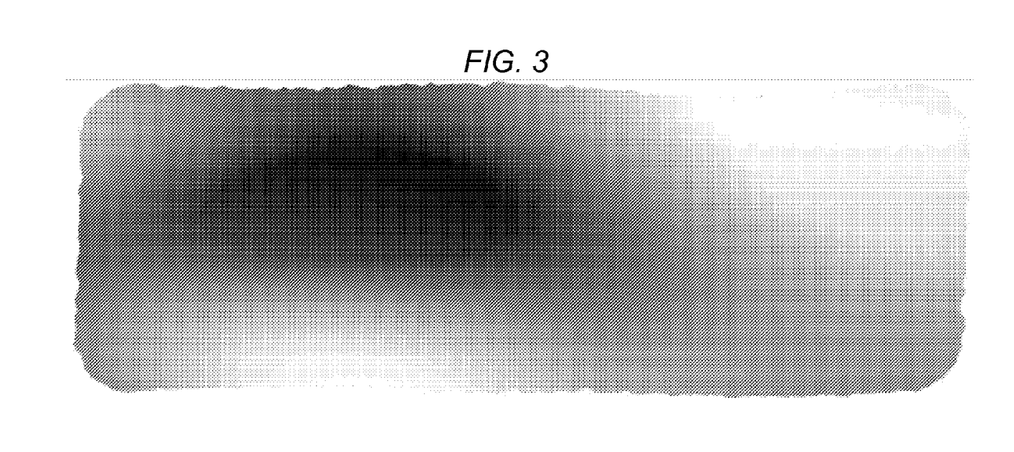
FIG. 3 illustrates a high contrast image with low frequency noise applied in accordance with one or more embodiments of the invention.
Figure 4:
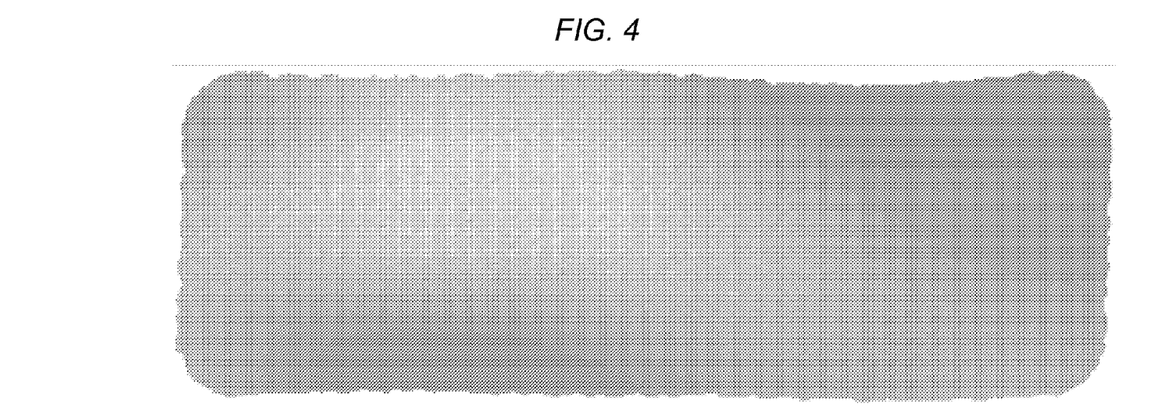
FIG. 4 is a high contrast image that illustrates the application of both high frequency and low frequency noise to an image (without an edge darkening affect) in accordance with one or more embodiments of the invention.

High frequency Perlin noise that is applied to an image/object establishes the resolution of the granularity. Thus, high frequency Perlin noise can determine how fine or coarse the water color effect will appear. Low frequency noise is applied throughout an image and provides a simulation of different saturation of the water color on the paper. FIG. 3 illustrates a high contrast image with low frequency noise applied. When high frequency and low frequency noise are combined and applied/multiplied to an image, the result simulates the appearance of a water color fill on an image. FIG. 4 is a high contrast image that illustrates the application of both high frequency and low frequency noise to an image (without an edge darkening affect). In the lighter areas of the image, the high frequency noise can be seen in the grain of the image. Similarly, the low frequency noise can be seen by the darker areas in the bottom left, top right, and lower right corners of the image.

In addition to the above, a scale parameter may be used to establish the desired level of granularity. In this regard, the combined noise may be scaled. Alternatively, embodiments may provide the ability to independently scale the low frequency and/or high frequency noise. Such scale adjusting capability may be presented to the user via a graphical user interface. In addition, the user may be provided with the ability to adjust the contrast and/or bias of the individual noise patterns to create/modify a variety of realistic looking watercolor effects.

Figure 5:
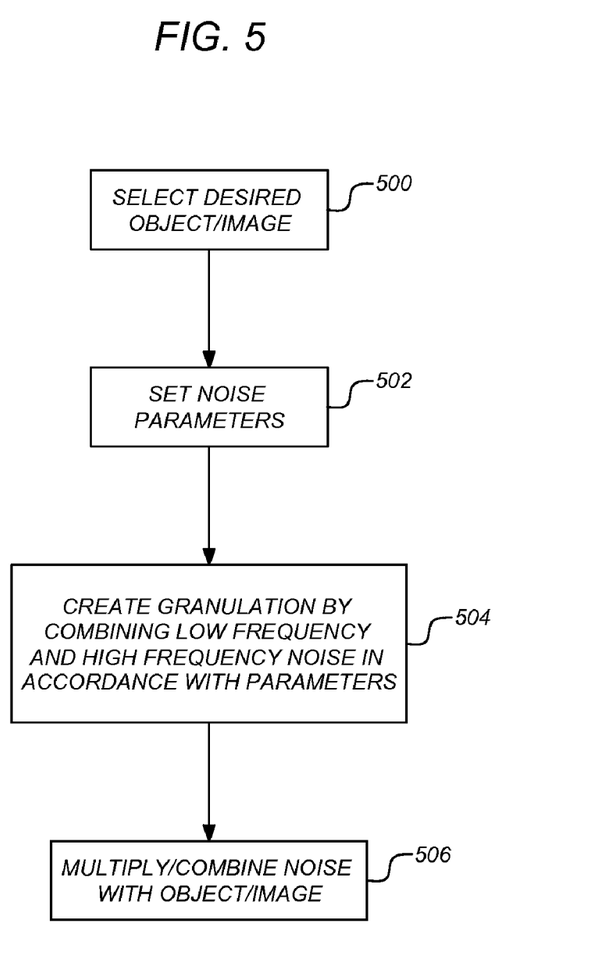
FIG. 5 is a flow chart illustrating the logical flow for determining a granulation in accordance with one or more embodiments of the invention.

FIG. 5 is a flow chart illustrating the logical flow for determining a granulation in accordance with one or more embodiments of the invention. At step 500, the object/image that the user desires to fill with watercolor is selected.

At step 502, the noise parameters (e.g., scale, contrast, and/or bias) are set (e.g., by the user or default values may be used).

At step 504, the granulation is created by combining the low frequency and high frequency noise in accordance with the parameters set at step 502. In other words, a simple multiplication of the low and high frequency noise may be performed.

At step 506, the noise is multiplied/combined with the selected object/image. An example of a resulting image with the desired grain is illustrated in FIG. 4. However, different parameters may be used to establish different looking watercolor effects.

Edge Effect

When watercolor paint is used on paper, the water and/or pigment may become saturated at certain locations of an image/object. Such saturation is likely to occur at particular locations around the edge of the image object. Embodiments of the invention attempt to simulate such edge darkening.

As described above, a rendering operation may utilize a shader (e.g., a pixel shader) to render the watercolor effect (i.e., that utilizes a GPU within the computer 100). In the prior art, to perform edge darkening, a blur (e.g., a Guassian blur) operation was performed. Such a blur operation provides a visual effect that blurs the edge such that the image appears as if it were viewed through a translucent screen. During a blur operation, the image is convolved with a Gaussian or normal distribution. Alternatively, a low-pass filter operation may be performed in which a filter is used to pass low frequencies but attenuates (or reduces) frequencies higher than a cutoff frequency. However, such blur operations and/or filter passes may be expensive in terms of processing time consumed.

It may be noted that to render an edge darkening effect using a pixel shader, knowledge of the distance from the current pixel to the edge of the image/object boundary may be required. To avoid expensive filter passes (e.g. using a Gaussian blur) to get the distance, embodiments of the invention create an outline stroke that covers the edge of the stroke that is to be filled (i.e., in addition to the fill that covers the interior of the boundary). Accordingly, a stroke is drawn over a contour edge of the image/object. The width of the stroke width may be based on an adjustable parameter (e.g., by the user).

Figure 6:
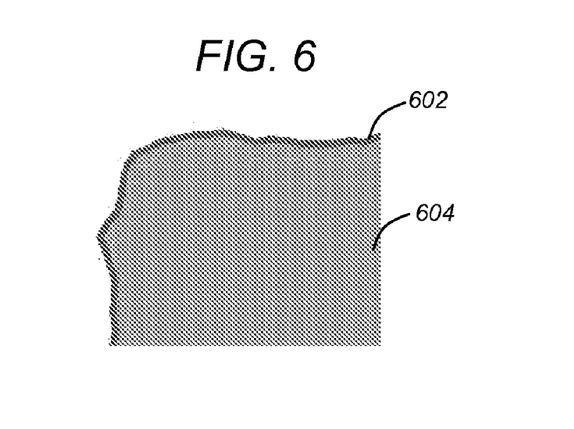
FIG. 6 illustrates a contour stroke 602 drawn on the edge of an object/image 604 in accordance with one or more embodiments of the invention.

FIG. 6 illustrates a contour stroke 602 drawn on the edge of an object/image 604 in accordance with one or more embodiments of the invention. As illustrated, the interior 604 of the object/image is rendered with transparency so that the outline stroke 602 is visible.

To draw the outline stroke 602, a set of two offset curves may be drawn. An offset curve is a curve that is offset from an original curve by a constant distance. The boundary of the image/object is used as the original curve and two offset curves are drawn based on the original curve. The distance between the offset curves comprises an adjustable width value that can be used to determine the thickness of an edge effect. UV coordinates may be mapped/applied to the outline stroke 602. Such UV coordinates may be constant values. For example, the U value may range from the start to the end of the outline stroke 602 while the V-values may range from 0 at the offset curves and 1 in the middle of the offset curves (i.e., the value ranges from 0 to 1 to 0 as the outline stroke 602 is traversed between the two offset curves).

In view of the above, it may be noted that the outline stroke is centered over the edge of the image/object. Embodiments of the invention may place primary importance on the part of the stroke that lies inside of the image/object (i.e., from the edge/boundary of the shape/object to the edge of the offset curve on the interior of the shape/object). The V-value is therefore highest (e.g., a value of 1) at the edge of the image/object (i.e., in the center of the outline stroke) and ranges between 1 and a value of zero at the edge of the offset curve. Nonetheless, one advantage of having the outline stroke 602 is that the curve's UV-coordinate is readily available.

Once the distance has been determined, the distance (and UV value) can be used to provide any desired edge effect. As described herein, such edge effects may include edge darkening. Alternatively, the edge effect may include a fast blur shadow (e.g., where a fade out shadow is rendered based on the distance from the edge), contour gradients (e.g., where the gradients follow the shape of the actual object based on the distance from the edge), different types of blending operations (e.g., linear blending, smooth step blending, etc.), special effects (e.g., a halo effect based on the distance), etc. In this regard, the distance calculation can be used to perform any type of edge effect where an image blur operation was used in the past to accentuate the edges.

In view of the above, embodiments of the invention first provide the ability to calculate/create the geometric faces that are part of both the interior of the image/object and the interior of the contour outline stroke 602. Once the geometric faces have been calculated and the distances/proximities determined (i.e., on a pixel-by-pixel basis), any desired effect that utilizes such proximities can be rendered.

In one or more embodiments of the invention, the edge proximity/distance calculation/determination is used to create an edge darkening effect. As part of such edge darkening, various passes may be conducted by a shader to render the final effect. However, while two passes are described herein, the invention is not intended to be limited to any particular number of passes or the use of any passes whatsoever. Accordingly, alternative techniques that provide for edge darkening may be utilized and performed in accordance with embodiments of the invention.

Figure 7:
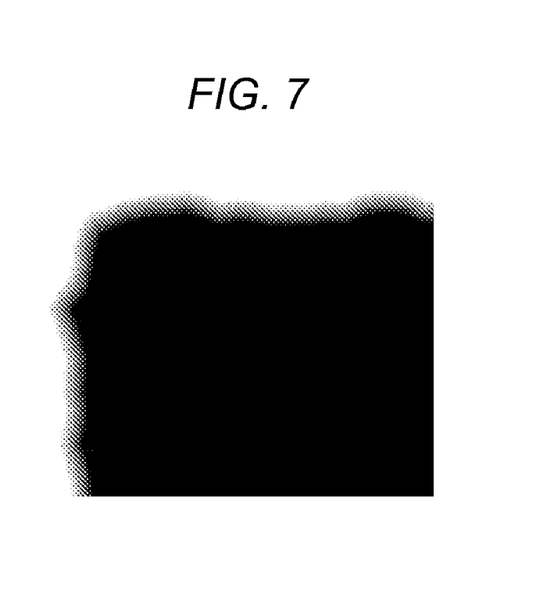
FIG. 7 illustrates the rendering of the v-coordinate into a buffer/texture in accordance with one or more embodiments of the invention.

In a first pass, the v-coordinate of the outline stroke 602 is rendered into a background buffer/texture (the fill will simply be rendered black) (e.g., thereby creating a mask). FIG. 7 illustrates the rendering of the v-coordinate into a buffer/texture in accordance with one or more embodiments of the invention.

In the second pass, various operations may be performed. First, the image with the desired granularity (i.e., as described above) may be rendered (e.g., as illustrated in FIG. 4). Thereafter, the edge darkening effect may be rendered on top of the image. To render the edge darkening effect, the distance/proximity to the closest edge is known from the stored v-coordinate and can be used as a texture in the $2^{nd}$ pass (i.e., the edge proximity can be retrieved from the texture).

Once the proximity has been retrieved for a particular pixel, the distance may be multiplied by low frequency noise (e.g., Perlin noise) in the second pass. Such a multiplication operation provides the ability to only achieve edge darkening where darker areas (higher saturation) appears in the image and no edge darkening in the lighter areas (i.e., the outline stroke 602 will be ignored in the $2^{nd}$ pass). In addition, the result of the multiplication may be further multiplied by the selected edge darkening color. Such an edge darkening color may be automatically determined or by may be selected, defined, or adjusted by the user. For example, the base color for the interior of the boundary 604 may be used and a brightness value may be applied to derive/determine the edge darkening color.

Accordingly, referring again to FIG. 7, it can be seen that the edge darkening effect is applied where the mask is gray (not black) and is applied in proportion to the intensity of the mask. The interior of the image/object has a V-value of 0 and is illustrated in monochromatic black while the edge of the outline stroke has a V-value of 1 (white) with values in between 0 and 1 (shown in gray) extending throughout the outline stroke.

Various parameters for the edge darkening effect may also be utilized and may be either automatically determined (i.e., without user input) or may be defined/adjusted by the user. Such parameters may include the width of the stroke/edge darkening (i.e., the width of the outline stroke 602), the edge darkening color, and edge darkening propagation. To accommodate a specific width, the distance between the inner and outer offset curves is merely adjusted. The edge darkening color provides the ability to determine how much darker the edge appears when compared to the fill in the interior 604. The edge darkening propagation value determines how far the edge darkening extends beyond the low frequency noise value. To utilize such a propagation, the propagation value is multiplied by any resulting edge darkening.

Figure 8:
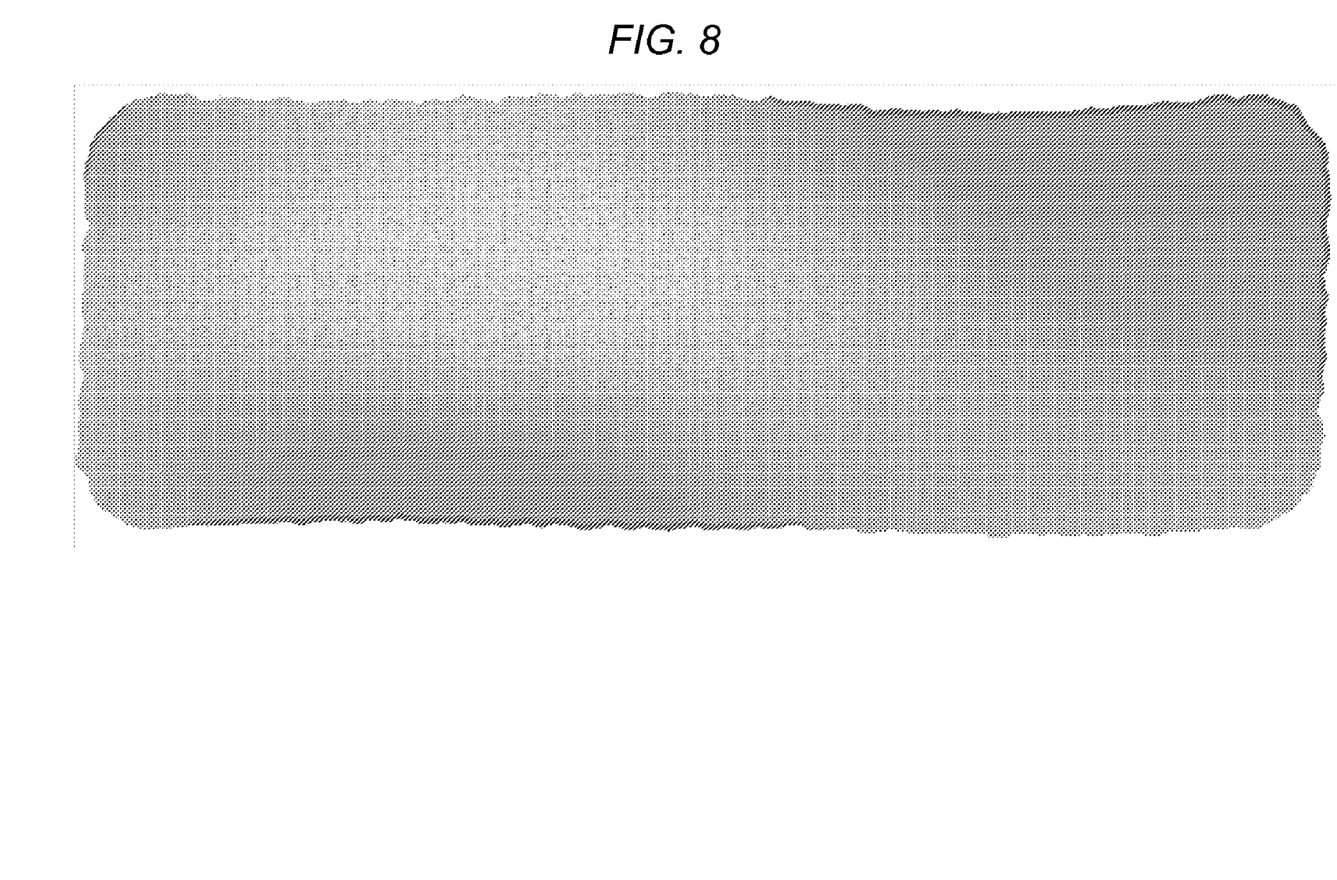
FIG. 8 illustrates the result of the edge darkening effect in accordance with one or more embodiments of the invention.

FIG. 8 illustrates the result of the edge darkening effect in accordance with one or more embodiments of the invention. As illustrated, the low frequency noise modifies the edge darkening such that the outline is more visible in the darker areas of the image (i.e., the bottom left, top right-middle, and bottom right corner) than the lighter areas of the image. Such an effect attempts to accurately reflect/simulate the saturation of water color and pigment on paper.

In view of the above, it may be noted that the vector rendering technique of embodiments of the invention may only use two (2) pixel shader passes (e.g., with 12 and 33 instructions respectively) and scales nicely even for larger drawings. However, as described above, any number of passes may be used in accordance with embodiments of the invention. Further, a pixel shader may not be utilized at all.

Logical Flow

Figure 9:
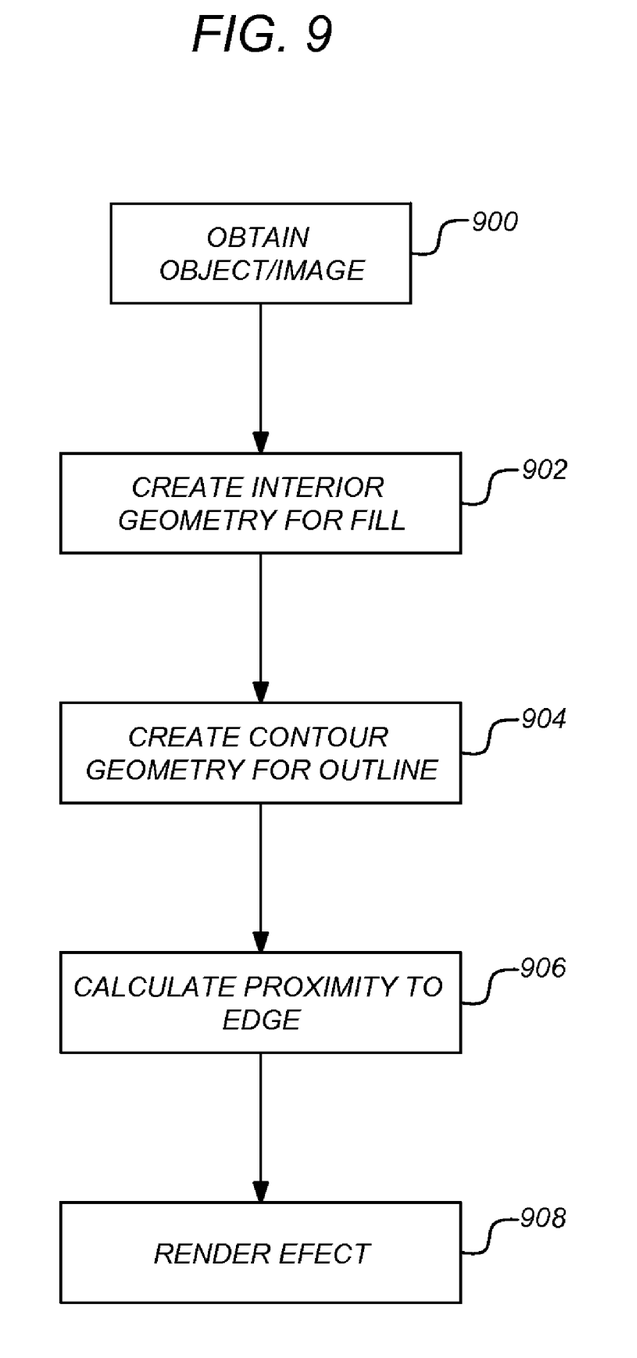
FIG. 9 is a flow chart illustrating the logical flow for determining an edge proximity and rendering an edge effect in accordance with one or more embodiments of the invention.

FIG. 9 is a flow chart illustrating the logical flow for determining an edge proximity and rendering an edge effect in accordance with one or more embodiments of the invention. At step 900, an object/image is obtained in a computer-generated rendering that is comprised of vector geometry.

To properly render any image/object, one must obtain faces to render. When utilizing a pixel shader, each pixel of the face is represented in a texture buffer that is used during the rendering process. To obtain such faces, step 902 creates interior geometry (i.e., faces) for a fill of the object/image. In this regard, a tessellation may be created for the fill inside of the object/image.

Similarly, at step 904, contour geometry (i.e., faces) for the inside of the outline stroke (i.e., that covers an edge of the object) is created. As described above, such a contour geometry may be created by drawing two offset curves with the boundary contour utilized as the original curve. Thereafter, the area between the offset curves is tessellated with planar 3D faces/meshes.

At step 906, a proximity to the edge of the object for each pixel of the object and each pixel of the contour geometry is calculated. Such a proximity may be based on the proximity to the closest edge for each pixel. Further, such a calculation step 906 may also include storing the appropriate v-value for each pixel in a texture buffer. As described above, such a value would range from 1 (representing white) at the edge of the object (i.e., in the middle of the outline stroke) to 0 (representing black) as the pixel is located farther away from the edge of the object (i.e., towards the interior of object/image).

At step 908, the desired effect is rendered based on the proximities for each pixel. In this regard, such an effect may comprise an edge darkening effect, a fast blur shadow, contour gradients, a halo effect, or any other desired effect.

Figure 10:
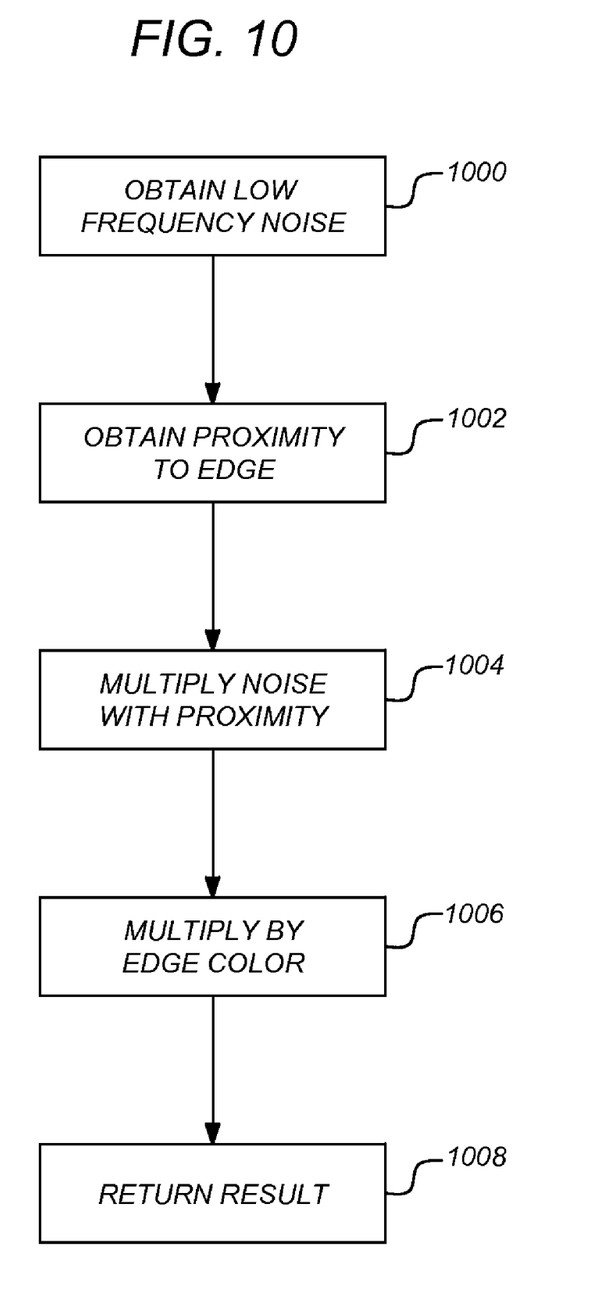
FIG. 10 is a flow chart illustrating the logical flow for creating a water color effect in accordance with one or more embodiments of the invention.

FIG. 10 is a flow chart illustrating the logical flow for creating a water color effect in accordance with one or more embodiments of the invention. At step 1000, a low frequency noise value is obtained for each pixel of the object and for each pixel of the contour geometry. Such low frequency noise values represent a pigment density of the water color.

At step 1002, the proximity to the edge of each pixel is obtained (e.g., from a texture buffer). At step 1004, the low frequency noise value for each pixel is multiplied with the corresponding proximity to the edge (e.g., the v-value) to obtain a first result for each pixel. Such a first result represents a mask with Perlin noise applied such that darker areas of the interior will have corresponding darker edges.

At step 1006, the first result for each pixel is multiplied with an edge color to obtain a second result for each pixel. Such a multiplication applies the selected edge darkening color to the first result (e.g., the mask).

Steps 1004 and 1006 may further include the multiplication of either the first or second result with additional parameters. For example, the second result may be multiplied by a propagation value, wherein such multiplying is used to determine how far edge darkening propagates into areas of the outline stroke having a low pigment density.

At step 1008, the second result for each pixel is returned. Such a returned result may merely comprise the shader returning the second result to the calling application. Alternatively, or in addition, such a returned second result may comprise rendering the second result to the display device.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for rendering an edge effect for an object, comprising:
    obtaining an object in a computer-generated rendering comprised of vector geometry;
    creating interior geometry for a fill of the object;
    creating contour geometry for an outline stroke that covers an edge of the object;
    calculating a proximity to the edge of the object for each pixel of the object and each pixel of the contour geometry; and
    rendering an effect based on the proximities.

2. The method of claim 1, wherein the creating the contour geometry comprises:
    creating two offset curves around the edge of the object; and
    tessellating an area between the two offset curves.

3. The method of claim 1, wherein the rendering comprises:
    obtaining a low frequency noise value for each pixel of the object and each pixel of the contour geometry, wherein the low frequency noise value represents a pigment density of a water color;
    obtaining the proximity to the edge of each pixel;
    multiplying, for each pixel, the low frequency noise value with the proximity to the edge to obtain a first result for each pixel;
    multiplying the first result for each pixel with an edge color to obtain a second result for each pixel; and
    returning the second result for each pixel.

4. The method of claim 3, further comprising multiplying the second result by a propagation value, wherein such multiplying is used to determine how far edge darkening propagates into areas of the outline stroke having a low pigment density.

5. The method of claim 1, wherein the width of the outline stroke comprises an adjustable parameter.

6. An apparatus for rendering an edge effect for an object in a computer system comprising:
    (a) a computer having a memory;
    (b) an application executing on the computer, wherein the application is configured to:
        (i) obtain an object in a computer-generated rendering comprised of vector geometry;
        (ii) create interior geometry for a fill of the object;
        (iii) create contour geometry for an outline stroke that covers an edge of the object;
        (iv) calculate a proximity to the edge of the object for each pixel of the object and each pixel of the contour geometry; and
        (v) render an effect based on the proximities.

7. The apparatus of claim 6, wherein the creating the contour geometry comprises:
creating two offset curves around the edge of the object; and
tessellating an area between the two offset curves.

8. The apparatus of claim 6, wherein the rendering comprises:
obtaining a low frequency noise value for each pixel of the object and each pixel of the contour geometry, wherein the low frequency noise value represents a pigment density of a water color;
obtaining the proximity to the edge of each pixel;
multiplying, for each pixel, the low frequency noise value with the proximity to the edge to obtain a first result for each pixel;
multiplying the first result for each pixel with an edge color to obtain a second result for each pixel; and
returning the second result for each pixel.

9. The apparatus of claim 8, further comprising multiplying the second result by a propagation value, wherein such multiplying is used to determine how far edge darkening propagates into areas of the outline stroke having a low pigment density.

10. The apparatus of claim 6, wherein the width of the outline stroke comprises an adjustable parameter.

11. An article of manufacture comprising a data storage device embodying logic that causes a computer-implemented system to render an edge effect for an object, wherein the logic comprises:
obtaining an object in a computer-generated rendering comprised of vector geometry;
creating interior geometry for a fill of the object;
creating contour geometry for an outline stroke that covers an edge of the object;
calculating a proximity to the edge of the object for each pixel of the object and each pixel of the contour geometry; and
rendering an effect based on the proximities.

12. The article of manufacture of claim 11, wherein the creating the contour geometry comprises:
creating two offset curves around the edge of the object; and
tessellating an area between the two offset curves.

13. The article of manufacture of claim 11, wherein the rendering comprises:
obtaining a low frequency noise value for each pixel of the object and each pixel of the contour geometry, wherein the low frequency noise value represents a pigment density of a water color;
obtaining the proximity to the edge of each pixel;
multiplying, for each pixel, the low frequency noise value with the proximity to the edge to obtain a first result for each pixel;
multiplying the first result for each pixel with an edge color to obtain a second result for each pixel; and
returning the second result for each pixel.

14. The article of manufacture of claim 13, further comprising multiplying the second result by a propagation value, wherein such multiplying is used to determine how far edge darkening propagates into areas of the outline stroke having a low pigment density.

15. The article of manufacture of claim 11, wherein the width of the outline stroke comprises an adjustable parameter.

* * * * *